W. PATTERSON.
OIL HEATER.
APPLICATION FILED JULY 5, 1919.
1,354,997.
Patented Oct. 5, 1920.
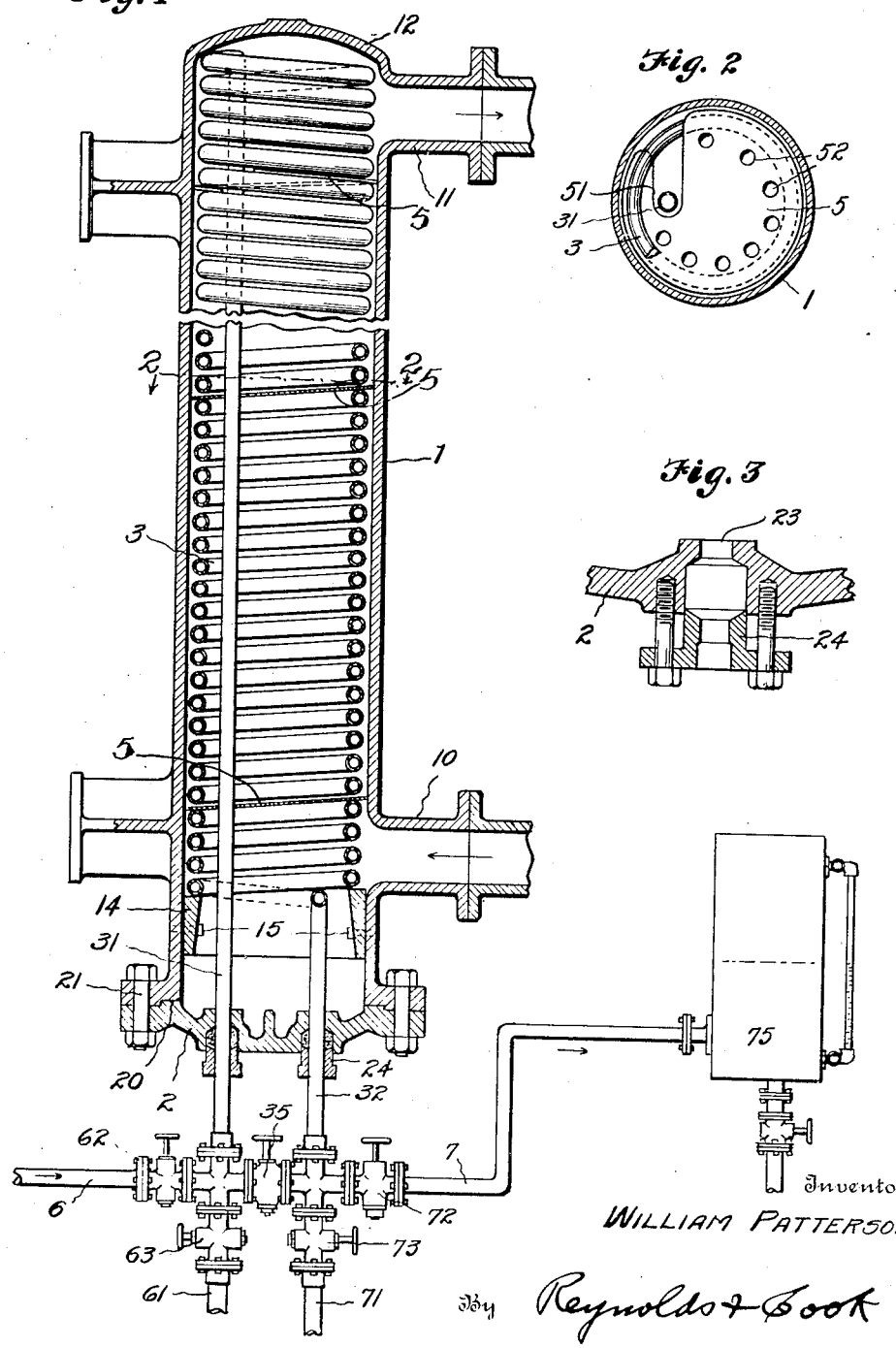
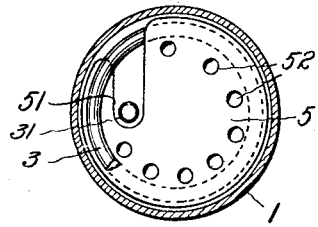
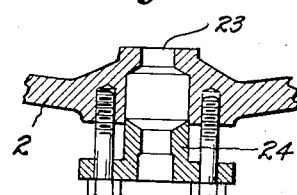
Inventor
WILLIAM PATTERSON
By Reynolds & Book
Attorney

UNITED STATES PATENT OFFICE.

WILLIAM PATTERSON, OF TACOMA, WASHINGTON.

OIL-HEATER.

1,354,997.  Specification of Letters Patent.  Patented Oct. 5, 1920.

Application filed July 5, 1919. Serial No. 308,817.

*To all whom it may concern:*

Be it known that I, WILLIAM PATTERSON, a citizen of the United States, and resident of the city of Tacoma, county of Pierce, State of Washington, have invented certain new and useful Improvements in Oil-Heaters, of which the following is a specification.

My invention comprises improvements in oil heaters, particularly oil heaters of the type used in vessels.

The object of my invention is to provide an oil heater of a type which will be tightly closed, and one in which there is a very slight possibility of leakage of oil into the steamline.

Another object of my invention is to provide an oil heater which may be easily and cheaply manufactured, and one which has few machined parts.

Other objects of my invention may be ascertained from a study of the specification and claims.

In the accompanying drawings I have shown my heater in a form of construction which is now preferred by me. It is evident, however, that the details of construction may be varied to suit conditions and that such variations will not affect the scope of my invention.

Figure 1 is a longitudinal sectional view of my invention, showing the inlet and drain connections of the steam line.

Fig. 2 is a transverse section through my oil heater, on the line 2—2 of Fig. 1.

Fig. 3 is a detail section of a high pressure packing gland which I employ in connection with my heater.

In oil heaters which are in use to heat fuel oil it has been found that parts are quickly subject to wear, and that the parts wear out to such an extent as to permit leakage of oil into the steam line. This is particularly true when high pressure steam is used. When this occurs, particularly when in use upon a vessel, the oil finds its way into the boilers and soon corrodes them. My heater is so designed that there is a minimum chance for leakage of oil into the steamline.

I employ a cylinder 1 as the vessel for containing the oil. An inlet port 10 and an outlet port 11 for the oil are provided at opposite ends of the cylinder. I prefer to construct the cylinder so that it is open at one end only, and preferably install it in an upright position, as shown. As herein shown, the upper end 12 is formed as an integral part of the cylinder, and the lower end is closed by means of a head 2, which fits the cylinder 1 tightly at the surface 20. Suitable bolts 21 may be employed to secure the head 2 of the cylinder so that a leak-proof-joint is formed.

As the heating element I employ a helical steam coil 3 within the cylinder 1, preferably formed of a single piece of tubing. This steam coil is supported from within the cylinder, as by means of a ring 14 secured from within the cylinder by means of bolts 15. The ring supports the body of the coil only, and no supporting strain is placed upon the inlet and outlet pipes.

The steam inlet pipe 31 and the outlet pipe 32 project downward from the coil and are independent of the ring 14. These pipes 31 and 32 project through openings 23 formed in the head 2. Packing glands 24, which are adapted to hold under the pressure of the oil within the cylinder, are employed about the pipes at these openings 23. These may be of any suitable construction.

I desire to distribute the oil and to regulate its flow within the cylinder so that it comes in contact with the entire heating coil 3. To this end I may employ baffle plates 5 so arranged that they may be inserted between the coils of the steam coil 3. These are best shown in Fig. 2. A slot 51 embraces the steam inlet pipe 31, and holes 52 are provided adjacent the coils of the steam coil 3. The aggregate area of the openings 52 and 51 should be greater than the area of either the oil inlet 10 or the outlet 11. Thus, no restriction of oil flow takes place, except as to its distribution adjacent the coils. I prefer to employ three or more of these baffle plates 5, one being placed just above the inlet 10, one just below the outlet 11, and another between these two points.

In operation upon naval vessels this oil heater may use either high pressure steam or exhaust steam at a considerably lower pressure. In order to permit this to be done inlet pipes 6 forming the high pressure steam line and 61 forming the low pressure steam line are both connected to the steam inlet 31. Valves 62 and 63 control the admission of steam into the inlet pipe 31. To the outlet pipe 32 are connected drain pipes 7, connected with the high pressure drain, and 71, connected with the exhaust steam drain or to a vacuum. Similar valves 72 and 73 control the admission of steam into the proper drain pipes from the steam coil. A water seal 75 of any suitable design may be employed in connection with the high pressure steam drain line 7. Between the inlet pipe 31 and the outlet pipe 32 I employ a cut-off valve 35. This valve, when opened, connects the inlet pipe 31 and the outlet pipe 32 to permit both to drain through the high pressure drain 7 or the low pressure drain 71.

When high pressure steam is to be used the valves 62 and 72 are opened and the valves 63 and 73 are closed. Valve 35 is closed during the operation of the heater and is only opened when it is desired to drain the steam coil 3. The high pressure steam then passes through the coil 3 and out through the pipe 7. The oil being directed by the baffle plates 5 flows upward and is distributed about the coil 3 in order to better heat it. If it is desired to use exhaust steam the valves 62 and 72 are closed and the valves 63 and 73 are opened.

In order to drain the steam coil 3 the valves 62, 63 and 72 are closed and the valves 35 and 73 are opened. The inlet pipes 31 then drain by gravity through the drain pipe 71, as will the remainder of the coil 3. If the heater is inverted, such drainage must be accomplished by creating a vacuum in the drain 71.

It will be seen that the only possible chance of wear between the members of the coil 3 and the cylinder 1 is at the point where the inlet 31 and the outlet pipe 32 pass through the openings 23 in the head. The body of the coil is supported from within the cylinder, hence the possibility of wear upon the inlet and outlet pipes is reduced. The heater has only the one head, and the possibility of leakage is reduced thereby. If any leakage does take place between the cylinder and the head 2 this cannot by any chance enter the steam line. If the point of wear upon the pipes 31 and 32 where they pass through the openings 22 and 23 is occasionally inspected there is no possibility of a leakage occurring at this point. Thus, all danger of a leakage of oil into the steam line is reduced to a minimum, and may be done away with entirely if inspections are made regularly and carefully at the two points.

What I claim as my invention is:

1. An oil heater comprising, in combination, a cylinder open at one end only and having oil inlet and outlet openings at opposite ends, a head fitting upon the open end of said cylinder, and forming a tight closure therefor, a steam coil within said cylinder, steam inlet and outlet pipes forming an integral part of said coil, and projecting through openings in the head, a ring secured within the cylinder and contacting substantially throughout its periphery at its upper edge with the lowermost convolution of said coil for supporting the body of the coil independently of the steam inlet and outlet pipes, and stuffing boxes about the steam inlet and outlet pipes and secured in the head to prevent leakage of oil from the cylinder.

2. An oil heater comprising, in combination, a cylinder tightly closed at its ends and having oil inlet and outlet openings at opposite ends, a steam coil within said cylinder, steam inlet and outlet pipes forming an integral part of said coil, and projecting through openings in the cylinder, a ring removably secured within the lower portion of the cylinder, and shaped to support substantially the entire periphery of the lowermost convolution of said coil independently of the steam inlet and outlet pipes, and stuffing boxes about the steam inlet and outlet pipes and secured in the cylinder to prevent leakage of oil from the cylinder, said pipes having no supporting strain thereupon.

3. An oil heater comprising, in combination, a cylinder tightly closed at both ends and having oil inlet and outlet openings at opposite ends, a helical steam coil within the cylinder, and baffle plates inserted between coils of the helix and positioned between the oil inlet and outlet openings, said baffle plates having holes therein adjacent the steam coil.

4. An oil heater comprising, in combination, a cylinder tightly closed at both ends and having oil inlet and outlet openings at opposite ends, a helical steam coil within the cylinder, and baffle plates inserted between coils of the helix and positioned between the oil inlet and outlet openings, said baffle plates having holes therein of greater aggregate area than the area of either the oil inlet or outlet opening, said holes being positioned adjacent the steam coil.

5. An oil heater comprising, in combination, a cylinder tightly closed at both ends and having oil inlet and outlet openings at opposite ends, a steam coil within the cylinder having inlet and outlet pipes projecting downward therefrom, supply pipes for steam at different pressures connected with the steam inlet pipe of said coil, valves controlling the admission of steam thereto, drain pipes for steam at different pressures connected with the steam outlet pipe of the coil, valves controlling the admission of steam from the coil into said drain pipes, and a cut-off valve connecting said steam inlet pipe with one of said drain pipes, said cut-off valve being normally closed.

6. An oil heater comprising, in combination, a cylinder tightly closed at both ends and having oil inlet and outlet openings at opposite ends, a steam coil within the cylinder having inlet and outlet pipes projecting downward therefrom, a steam supply pipe and a drain pipe connected to the steam inlet pipe and the outlet pipe, respectively, of said coil, a valve controlling the admission of steam thereto, and a cut-off valve connecting said steam inlet pipe and said drain pipe, said cut-off valve being normally closed.

Signed at Seattle, Washington, this 28th day of June, 1919.

WILLIAM PATTERSON.